United States Patent [19]

Mather et al.

[11] 4,168,757

[45] Sep. 25, 1979

[54] DRIVE SYSTEM FOR A SKID STEER LOADER

[75] Inventors: Joseph M. Mather, Lisbon; Gerald M. Berg, Milnor; Larry E. Albright, Gwinner, all of N. Dak.

[73] Assignee: Clark Equipment Company, Buchanan, Mich.

[21] Appl. No.: 879,411

[22] Filed: Feb. 21, 1978

[51] Int. Cl.² ............................................. B62D 11/04
[52] U.S. Cl. ...................................... 180/6.48; 60/484
[58] Field of Search ................ 180/6.48, 66 R, 89.12; 60/DIG. 10, 484, 486

[56] References Cited

U.S. PATENT DOCUMENTS

| | | | |
|---|---|---|---|
| 3,895,728 | 7/1975 | Heggen | 180/89.12 |
| 3,951,222 | 4/1976 | Fletcher | 180/44 F |
| 3,980,347 | 9/1976 | Griesenbock | 188/72.4 |
| 4,055,262 | 10/1977 | Bauer et al. | 18/89.12 |

*Primary Examiner*—John A. Pekar
*Attorney, Agent, or Firm*—Ernst H. Ruf

[57] ABSTRACT

A skid steer loader having an improved hydrostatic drive means. A skid steer loader comprises a main frame having a center compartment partially defined by a pair of longitudinally extending, laterally spaced side beams. The engine for the vehicle is mounted at the rear of the center compartment. An elongated transmission case is provided at a forward end of the center compartment and encloses the chain and sprocket drives for the vehicle. Side walls of the transmission case are displaced from the side walls of the main frame, with the drive means for the vehicle mounted on the outside of the case at a mid-portion thereof. The present improvement in the skid steer loader redesigns a drive system used with vehicles of substantially greater load capacity to provide a pair of independent hydrostatic drive means, each incorporating a hydrostatic transmission and having a gear reduction unit mounted on the outside of an elongated transmission case.

7 Claims, 8 Drawing Figures

DRIVE SYSTEM FOR A SKID STEER LOADER

FIELD OF THE INVENTION

This invention pertains to the art of skid steer loaders and more particularly to an improvement in the drive system for the skid steer loader.

BACKGROUND OF THE INVENTION

Skid steer loaders are vehicles possessing a high degree of maneuverability and which are propelled and maneuvered by driving the wheels on one side of the vehicle at a different speed and/or in a different direction from those on the other side so as to achieve a turning motion. In the case where the wheels on one side are driven forwardly and those on the opposite side reversely, the loader will turn on its axis or, in other words, spin in its own tracks.

In many instances, the machine must work in low clearance areas. Initial efforts to produce a machine having the capability of low clearance applications as well as high maneuverability were successful, but such machine was limited with respect to load and capacity and the drive system of such machine was not readily adapted to higher capacity applications. Thus, a machine having a low vehicle clearance was achieved, however, only at the cost of a substantial modification of the system and such drive system was not adaptable to higher capacity machines and applications.

DESCRIPTION OF THE PRIOR ART

The most pertinent prior art vehicle is disclosed in U.S. Pat. No. 4,055,262 entitled "Loader Main Frame for Skid Steer Loader" by James J. Bauer, et al, which issued on Oct. 25, 1977 to the Assignee of the present invention. In the above U.S. patent a lower vehicle profile for the operator was achieved by providing a main frame which included an open center compartment wherein was mounted an elongated transmission case. The sides of the transmission case being displaced from the sides of the main frame, with the drive means for the vehicle mounted on the outside of the case at respective mid-portions of opposite sides thereof. Operator space was provided between the main frame of the vehicle and the transmission case at the front end of the case, enabling the operator to straddle the case, thus reducing the height requirement for the vehicle. The chain and drive sprockets which drove the wheels of the vehicle were contained within the transmission case and stub axles extended outwardly therefrom to carry at their respective ends the wheels mounted on each side of the vehicle. The chain and sprocket drives contained within the case were driven directly by hydrostatic motors of the Geroller type mounted on the outside of the case.

However, such a direct drive system is limited by the capacity of the Geroller motors. In heavy duty applications the skid steer vehicles themselves are larger and heavier and specifically designed for heavier loads. The chains associated with the chain and sprocket drives of such vehicles do not offer as much mechanical reduction. Such vehicles also require higher axle torques because of weight and/or wheel diameter. Therefore, it would be desirable to provide an intermediate gear reduction in the system into which can be coupled an appropriate size Geroller motor to produce the desired torques and speeds.

The use of a gear reduction apparatus in a hydrostatic loader is not unknown and examples of the same can be found in U.S. Pat. Nos. 3,635,365 or 3,895,728, both of which have been assigned to the Assignee of the present invention. However, it is desirable to achieve the high load capacity of the vehicles disclosed in the latter noted patents without sacrificing the low vehicle profile of the vehicle disclosed in the aforementioned U.S. Pat. No. 4,055,262.

Further, the arrangement of the present invention places the Gerroller type motors and the gear reduction unit of the hydrostatic drive system on the outside of an oil filled case containing the chain and sprocket drives for the system. Such an arrangement makes these elements readily accessible for replacement and repair.

Accordingly, the present invention produces a particular arrangement of a vehicle drive system for a skid steer loader which achieves relatively high load capacity for the vehicle within a drive system redesigned for low clearance applications.

SUMMARY OF THE INVENTION

The present invention comprises an improved drive system for a skid steer loader vehicle. The improved drive system includes an elongate transmission case which is compatible with a main frame of a skid steer vehicle, the main frame comprising a center compartment partially defined by a pair of longitudinally extending, laterally spaced side beams. The engine of the vehicle is mounted at the rear of the center compartment and the transmission case is mounted at a forward end of the compartment.

Protruding from the case at respective front and rear ends thereof are the stub axles for the vehicle. Brackets mounted on the stub axles secure the case to the side beams of the main frame. Housed within the case are the chain and sprocket drives for each set of wheels for the vehicle. Bolted to the outside of the transmission case are a pair of gear housings having mounted thereon a pair of hydrostatic motors which drive the gear reduction units which drive the chain and sprocket drives provided therein to drive the respective set of wheels associated therewith. The transmission case is oil filled to lubricate the chain and sprocket drives for the vehicle. The mounting of the gear reduction units and the drive motors on the outside of the case permits a relatively long narrow configuration for the case enabling a re-design of the operator's compartment which substantially increases the amount of leg room in the operator's compartment by permitting the operator to straddle the transmission case.

To the extent that U.S. Pat. No. 4,055,262 will aid the reader in his understanding of the transmission system of the present invention, the specification of the aforementioned U.S. patent is incorporated herein by reference.

The advantages recited above, as well as many others, will become more apparent to the reader in the detailed description set forth below and said description is viewed in conjunction with the drawings provided which are described as follows.

DESCRIPTION OF THE PREFERRED EMBODIMENT

Figure 1:
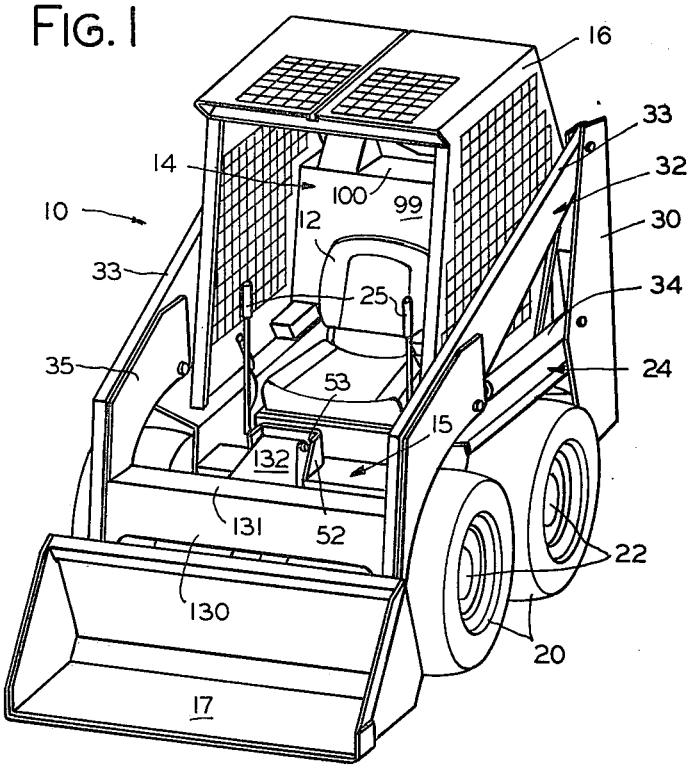
FIG. 1 is a perspective view of a skid steer loader incorporating the improved drive system of the present invention.
Figure 2:
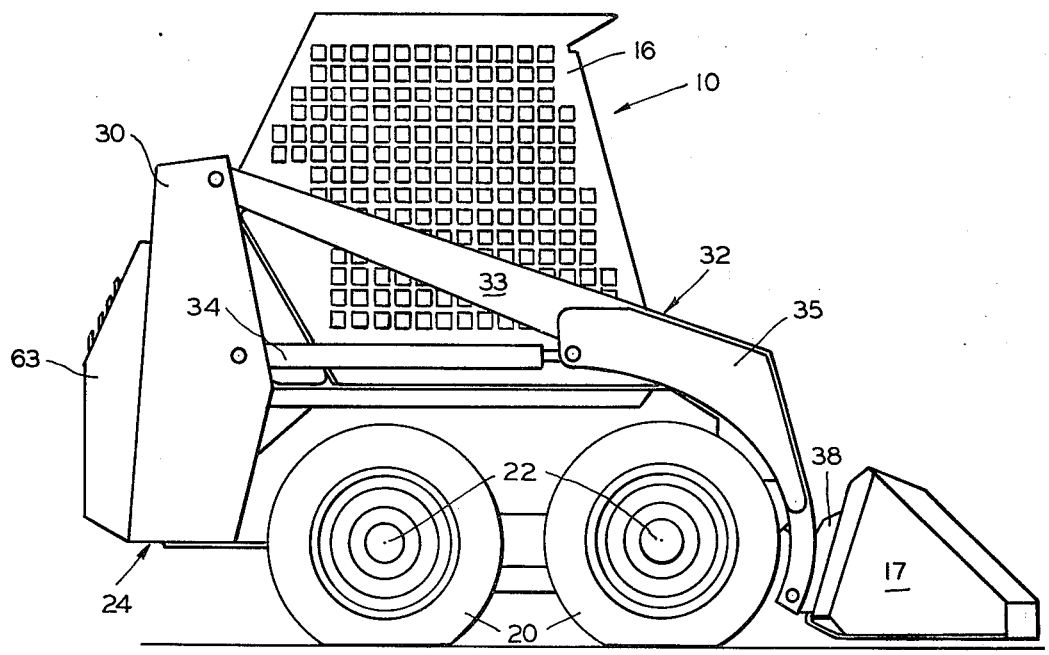
FIG. 2 is a side elevational view of the skid steer loader of FIG. 1.

Referring now to FIGS. 1 and 2, the specifics of construction for a vehicle incorporating the present invention do not differ substantially from the vehicle shown in the aforementioned U.S. Pat. No. 4,055,062, except for size and weight. Accordingly, references to U.S. Pat. No. 4,055,062, supra, provide a complete description of the general construction of a vehicle incorporating the present invention. Therefore, we incorporate columns 5 and 6, lines 3-68 and 1 to 35 of U.S. Pat. No. 4,055,062, herein, specifically by reference to describe FIGS. 1, 2, and 3 of the subject application.

Constructional details of the transmission case used with the present invention may vary from the construction of transmission case 70 of U.S. Pat. No. 4,055,062, supra, as set forth below.

TRANSMISSION CASE

Figure 3:
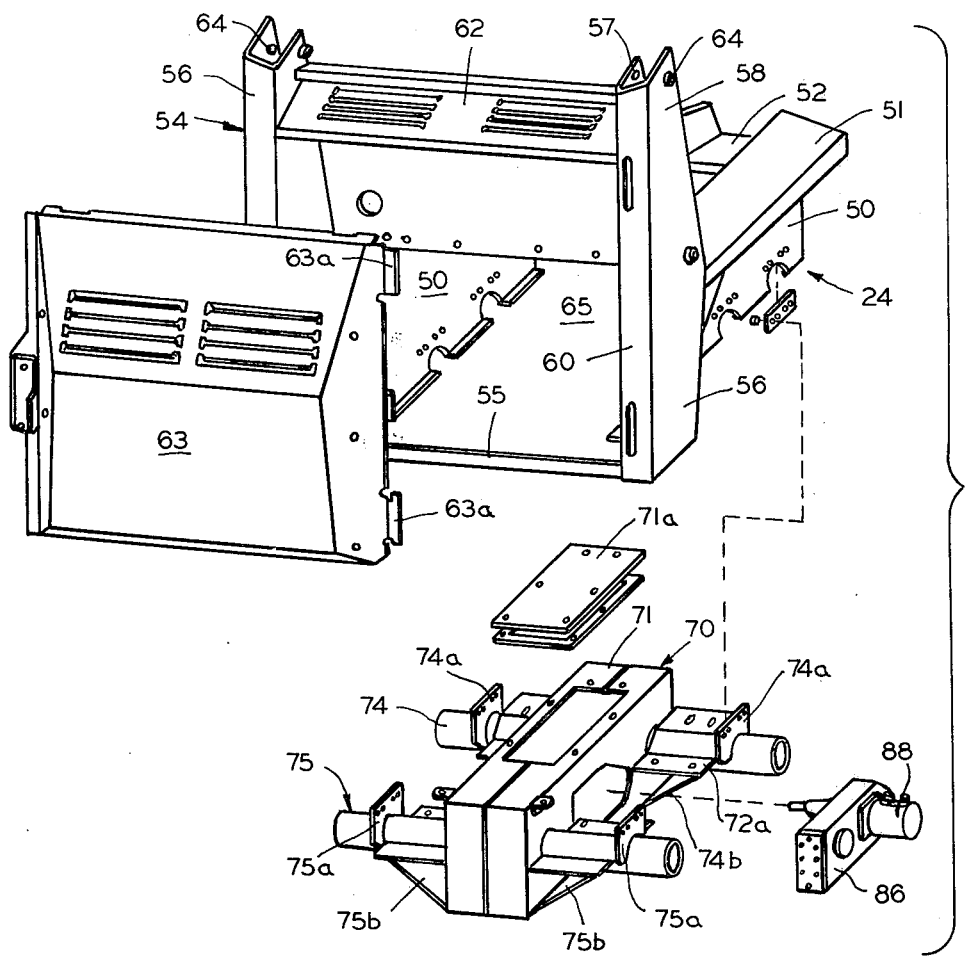
FIG. 3 is a partial exploded perspective view of the main frame of the skid steer loader showing the major structural elements of the vehicle associated with the improved drive system as viewed from the rear thereof.
Figure 4:
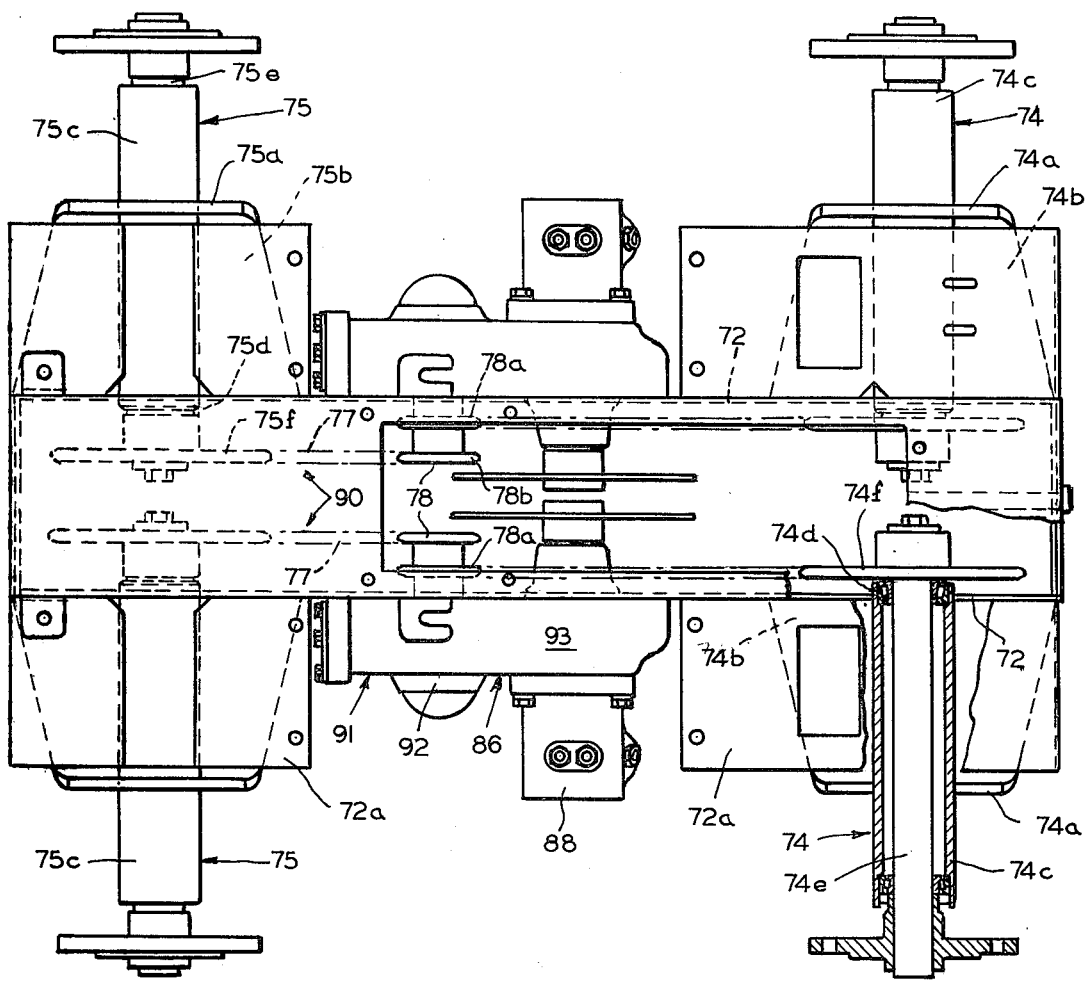
FIG. 4 is a top plan view of the transmission case shown at the bottom of FIG. 3, the case having portions thereof removed for clarity.
Figure 5:
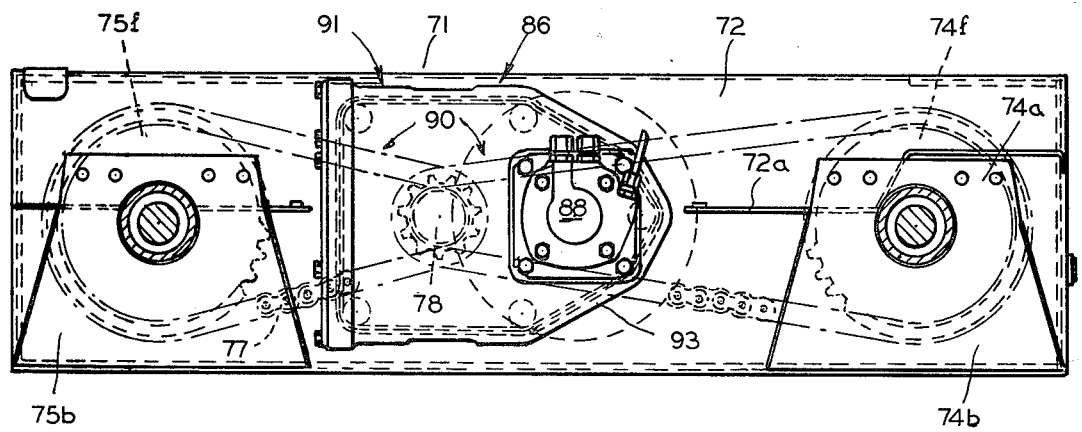
FIG. 5 is a schematic side elevational view of FIG. 4, with portions of the case being removed for clarity.

Referring now to FIGS. 3, 4 and 5, the sub-frame or transmission case 70 comprises top wall 71, side walls 72 and bottom wall 73. Front and rear stub axles 74,75 project from opposite sides of the case 70 adjacent each end. Axle housings 74c,75c are welded to the side walls 72 of the case 70 and open at respective inner ends 74d,75d into the compartment 70. Stub axle shafts 74e,75e are rotatably journalled in axle housings 74c,75c and carry at their inner ends wheel sprockets 74f,75f which are connected by chains 77 to the drive sprockets of an output shaft 78.

The front and rear axle housings 74c,75c are welded to the transmission case 70. The axle housings are then bored to receive axle shafts 74e,75e rotatably journalled in the axle housings 74c,75c therethrough. Openings in the top walls 71 provide access to the interior of the case 70. Cover plates 71a and 71b are mounted on the top wall 71 to seal the case 70.

The transmission case 70 presents an elongated substantially narrow profile with side walls 72 laterally displaced from the side beams 50 of the main frame 24 when the case 70 is mounted in place. Lateral flanges 72a, having longitudinal edges secured to side walls 72 are mounted on the front and rear stub axles 74,75 to provide floor plates for the bottom of the operator's compartment 14, enabling an operator seated in compartment 14 to straddle the case 70.

Figure 6:
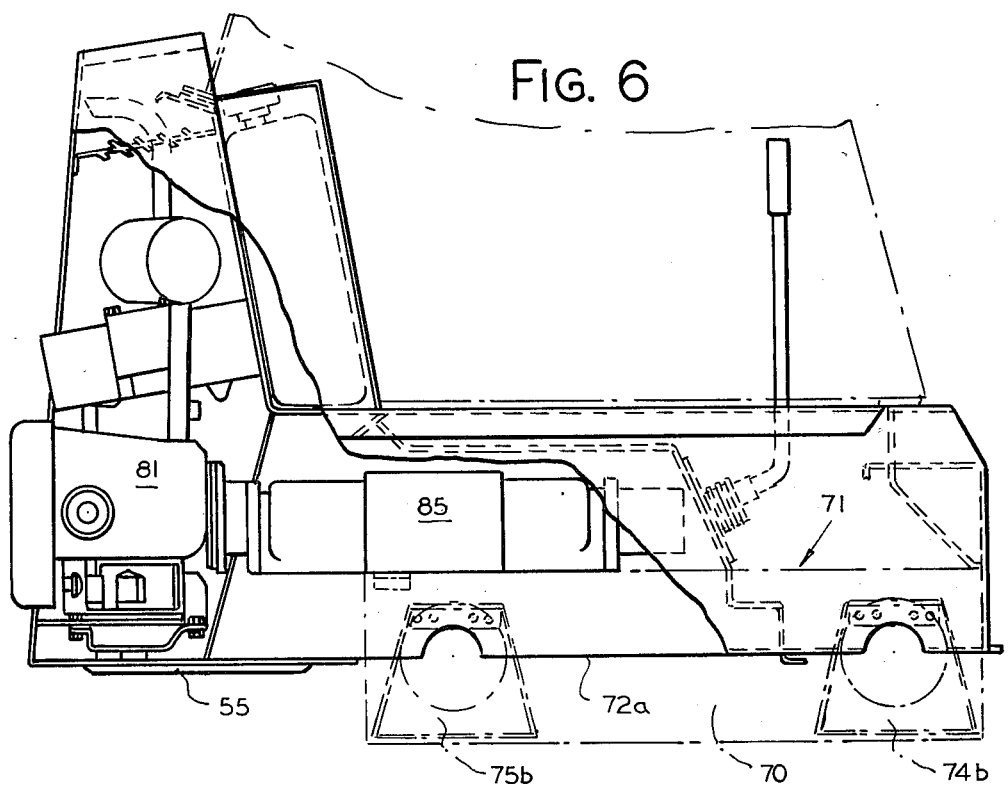
FIG. 6 is a side elevational view of the main frame of a skid steer vehicle with portions broken away to show the elements of the engine compartment of the vehicle to provide a better understanding of the drive system of the vehicle.

The hydraulic drive means for the vehicle 10 comprises first and second variable displacement pumps 85 (FIG. 6) driven on a common shaft connected to the engine drive shaft. First and second pumps 85a,85b are mounted on an upper surface of top wall 71 of case 70. Mounted on respective outer surfaces of opposite side walls 72 of case 70 are first and second gear reduction units 86,87. Suitably mounted in the gear reduction units 86,87 are first and second hydrostatic motors 88 and 89. The mounting of the gear reduction units 86,87 is best shown in FIG. 4. Each gear reduction units 86,87 has an output shaft 78 extending into the transmission case through the side walls 72. The shaft 78 carries at an inner end thereof drive sprockets 78a and 78b. The drive sprockets 78a and 78b comprise portions of chain and sprocket drives 90 provided for each set of wheels 20 and carried in the transmission case 70. Endless chains 77 connect drive sprockets 78a,78b, to the wheel sprockets 74f,75f carried on the inner ends 74d,75d of the stub axle shafts 74e,75e of the front and rear stub axles 74,75. Drive sprocket 78a lies adjacent the side wall 72 of the transmission case 70. A first endless chain 77 connects the drive sprocket 78a to the front wheel sprocket 74f carried at the inner end 74d of the front axle 74. Drive sprocket 78b, carried at the outer end of the output shaft 78, is connected by a second endless chain 77 to the wheel sprocket 75f carried at the inner end 75d of rear axle 75.

Hydrostatic motors 88 and 89 are mounted on the gear reduction units 86,87 to provide driving power to the gear reduction units 86,87. First and second pumps 85a,85b are operatively connected by hydraulic hoses to the first and second hydrostatic motors 88,89 mounted on the respective gear reduction units 86,87 mounted on the outside of transmission case 70.

It will be appreciated that each of the first and second variable displacement pumps 85a and 85b include a circular array of pistons and cylinders which revolve against swash plates which may be tilted by means of a control linkage to vary the displacement of the pumps 85a,85b. The control linkage provided for the variable displacement pumps 85a,85b may be like that shown in U.S. Pat. No. 4,043,416 issued Aug. 23, 1977 entitled "Skid Steered Tractor Vehicle Combined Steering Lever and Auxiliary Control with Self-Centering Mechanism", and assigned to the Assignee of the present invention.

GEAR REDUCTION MEANS

The gear reduction units 86 and 87 are mounted on respective opposite side walls 72 of the transmission case 70. The gear reduction units 86,87 are substantially similar and would present mirror images in the plan view of the transmission case 70 shown in FIG. 4. Accordingly, only the gear reduction mechanism 86 will be described in detail.

Figure 7:
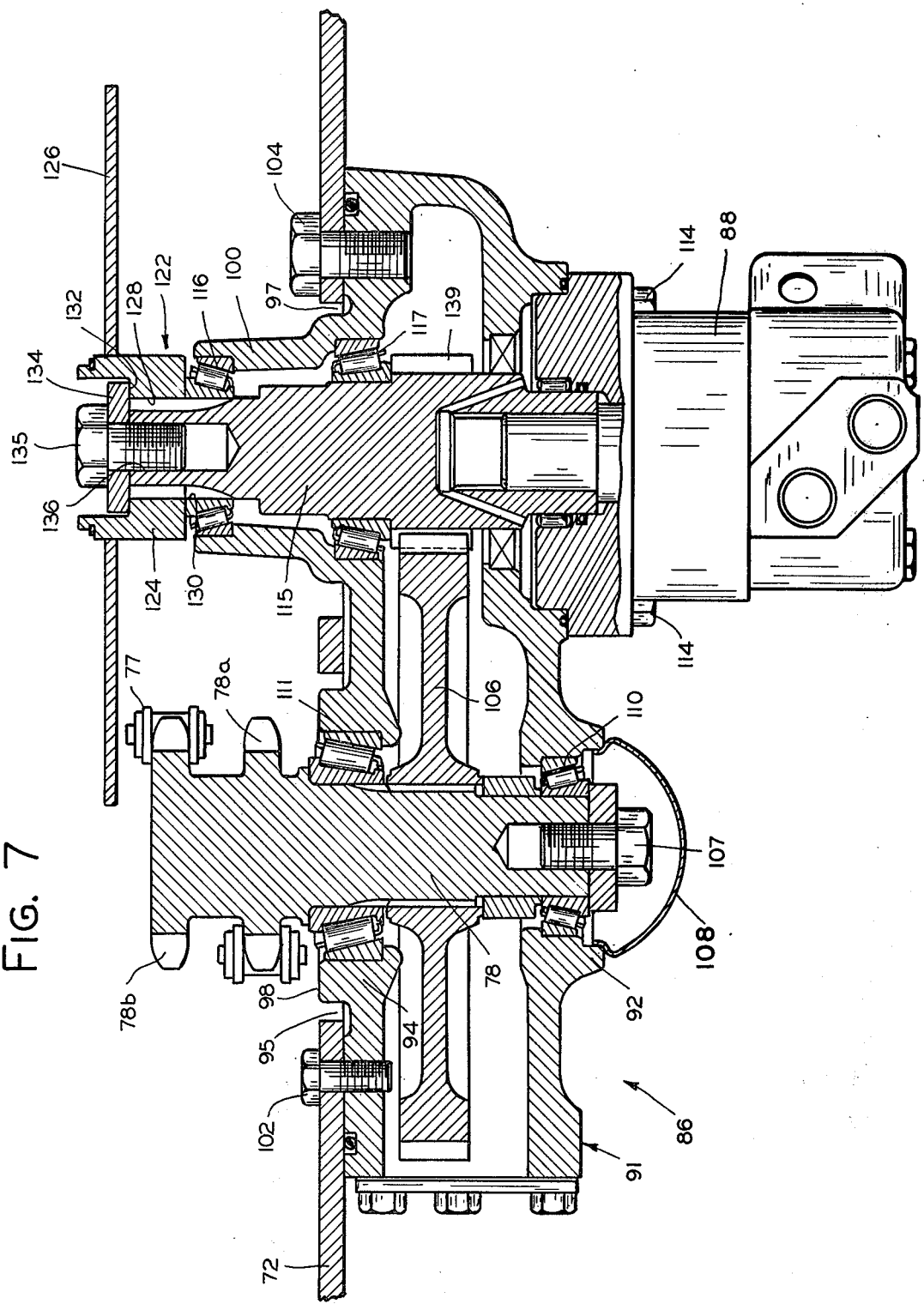
FIG. 7 is a plan view, partially in section, of the gear reduction mechanism employed in the drive system of the present invention.

As seen in FIG. 7 the gear reduction unit 86 is a generally elongate structure including an outer case 91 having a hub 92 provided at a rear end portion of the case 91. The gear case 91 also has a forward portion 93 which tapers from the hub 92. An inner wall 94 of the gear case 91 abuts the side wall 72 of the transmission case 70, with openings 95 and 97 in the case 70 receiving inwardly extending portions 98 and 100 of the wall 94 of the case 91 therethrough. Bolts 102 and 104 extend through openings in the side wall 72 of the case 70 to engage complementary threaded openings in the side wall 94 of the case 91, to mount the gear reduction unit 86 on the outside of the transmission case 70.

Mounted in the hub 92 is a reduction gear 106 which is rigidly coupled to the output shaft 78 of the gear reduction units 86 for rotation therewith. The output shaft 78 is held in place by a bolt 107 and an end cap 108 provided at the inner end of the hub 92, and suitably journalled in the hub 92 at 110 and in the portion 98 at 111. The inner end of output shaft 78 extends through the portion 98 of the case 91 into the transmission case 70 through the opening 95 in the side wall 72.

The output shaft 78 carries at its inner end sprockets 78a and 78b as above-described which carry endless chains 77 to interconnect the sprocket 78a with its respective front sprocket 74f and the sprocket 78b with its respective rear sprocket 75e.

Mounted adjacent the hub 92 of the gear case 91 is a Geroller motor 88 which is bolted on the gear case 91 as by bolts 114. An output shaft 115 of the Geroller motor 88 extends through the gear case 91 and into the transmission case 70 of the skid steer loader 10. The output shaft 115 of the Geroller motor is journalled in the inner portion 100 of the case 91 at the top and bottom thereof as at locations 116 and 117 and extends into the transmission case 70 through the opening 97 provided in the side wall 72.

Bolted at the inner end of the end portion 100 of the gear case 91 is a brake disc assembly 122 comprising a hexagon-shaped member 124 having a brake disc 126 floatingly mounted thereon. The member 124 has a central bore 128 complementary to a bore 130 provided in the inwardly extending portion 100 of the gear case 91. The member 124 has a step 132 provided therein and a washer 134 engages the step 132 and a bolt 135 is received in a threaded opening 136 provided in the end of the output shaft 115, the washer 134 engaging step 132 and the bolt and washer combination 134,135 fixedly securing the brake disc assembly 122 to the rotating portion of the gear reduction unit 86 associated with the output shaft 115 of the Geroller motor. The brake assembly coupled to the drive system of the present invention is similar to the brake assembly disclosed in U.S. patent application Ser. No. 745,905 entitled "Parking Brake for a Skid Steer Loading Vehicle", filed Nov. 29, 1976, now U.S. Pat. No. 4,124,084, and assigned to the Assignee of the present invention. Reference may be had thereto for a more complete understanding of the brake system of the vehicle.

At the lower end of the output shaft 115, pinion gear 139 engages the reduction gear 106 mounted on the output shaft 78 and received in the hub 92 of the gear case 91, the pinion gear 139 rotated by the output of the Geroller motor 88 that output successively rotating the reduction gear 106 and thereby rotating the output shaft 78 associated with the chain and drive sprockets 78a,78b and the chain and sprocket drive mechanism 90 mounted in the transmission case 70 of skid steer vehicle 10.

Drive shaft 115 extends through the area encircled by the chain 77 engaging the front drive sprocket 74f of the front stub axle 74. Therefore, the rotation of the output shaft 115 and the brake disc 126 associated therewith do not interfere in any way with the rotation of the output shaft 78 and the chain and sprocket drive 90 associated therewith.

HYDRAULIC SYSTEM

Figure 8:
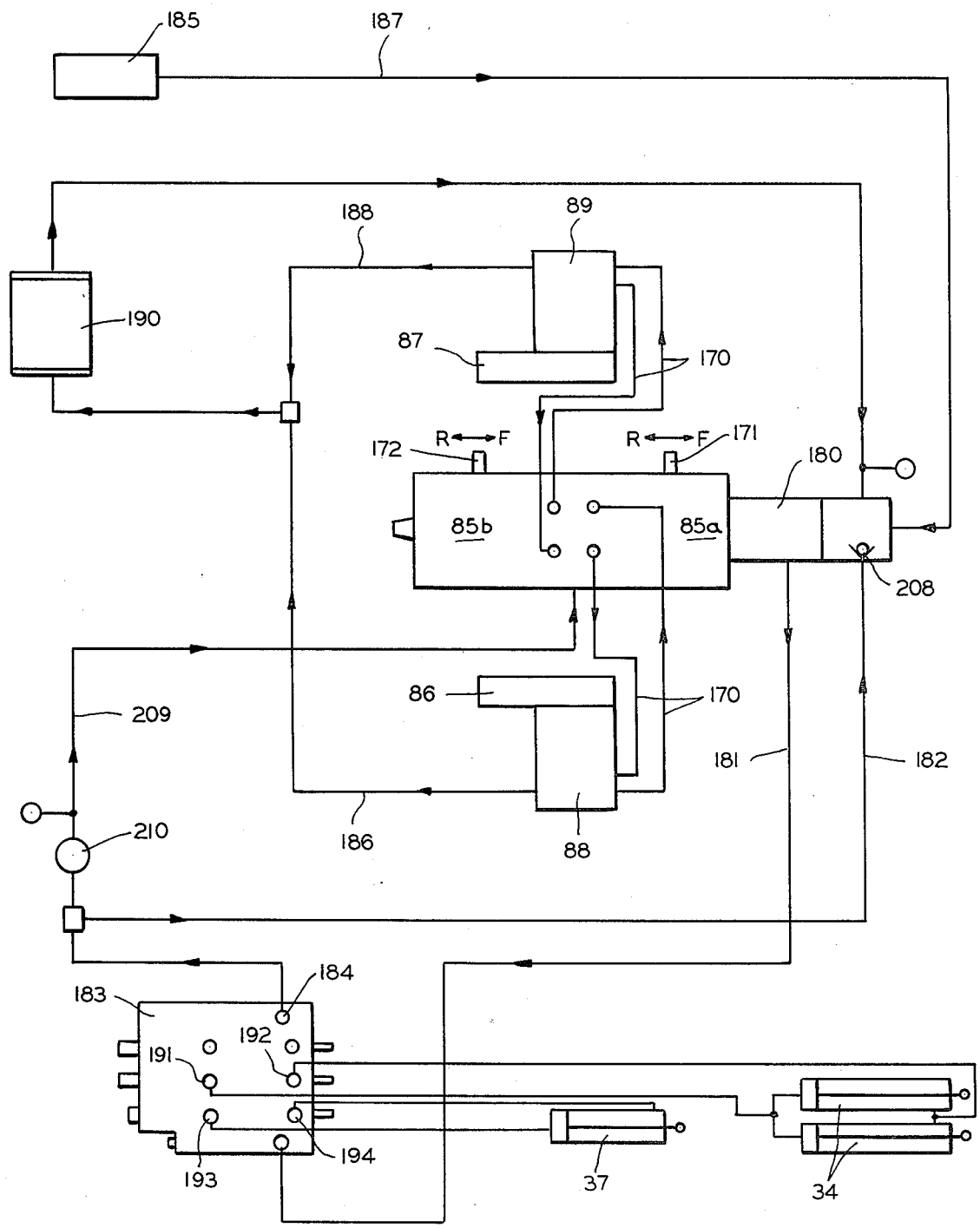
FIG. 8 is a schematic of the hydrostatic drive system of the skid steer loader.

Referring now to the hydraulic system driving the vehicle, please see FIG. 8. First and second variable displacement pump units 85a,85b are driven on a common shaft connected to the engine drive shaft. First and second pumps 85a,85b are operatively connected by hydraulic lines 170 to first and second hydraulic motors 88,89 mounted on gear reduction cases 86,87 mounted on the transmission case 70 of the vehicle 10.

Each of the first and second variable displacement pumps 85a,85b includes a circular array of pistons and cylinders which revolve against swash plates which may be tilted by means of a control linkage (not shown) connected to respective controls 171,172 on the first and second pumps 85a,85b to vary the displacement of the pumps 85a,85b. The control linkage is connected to control levers 25 on each side of the operator's seat 12 such that movement of either the right or left lever 25 will cause movement of control 171 or 172 so as to change the angle of the swash plate of either the pump 85a or 85b depending on the movement of the vehicle desired. It is understood, of course, that the engine 81 will be driven at a constant rpm ordinarily and variable speed is attained by manipulation of the swash plate.

An implement pump 180 is axially aligned with the pumps 85a,85b is is operatively connected by means of the hydraulic hoses 181 and 182 to a valve bank 183 which controls the lift and tilt cylinders 34,37 connected by a linkage (not shown) such as described in U.S. Pat. No. 4,043,416, to the control lever 25. A separate hydraulic reservoir 185 is provided to supply fluid as needed for the hydraulic components of the vehicle. Each of the motors 88,89 are provided with bleed-off lines 186,188 directing hydraulic fluid to a cooler 190. The fluid is carried from the cooler to the inlet portion of the pump 180.

Referring further to the valve bank 183, valve ports 191,192 operate the lift cylinders 34 and valve ports 193,194 operate the tilt cylinder 37. More fluid is required to extend the cylinders 34,37 than to retract them. Accordingly, additional fluid is drawn into the pump 180 from the reservoir 185 through line 187. When the cylinders are retracted an excess of oil is available. The excess oil is carried back to the reservoir through line 182, by-pass valve 208, and line 187. Line 209 carries oil from outlet 184 of valve bank 183 through filter 210 to main pumps 85a and 85b.

The drive system shown and described thus presents an improvement in a skid steer vehicle of increased capacity which is compatible with the low profile vehicle of the prior art. While only a single embodiment of our invention has been described in detail, it will be understood that the detailed description is intended to be illustrative only and that various modifications and changes may be made to our invention without departing from the spirit and scope of it, therefore, the limits of the invention should be determined from the attached claims.

We claim:

1. An improved drive system for a skid steer vehicle having a loader main frame comprising laterally spaced longitudinally extending side beams and cross members at each end defining a generally rectangular interior space for receiving and partially surrounding a transmission case, said interior space also receiving an engine and hydraulic drive means for the vehicle, the drive system including a relatively narrow elongate transmission case having side walls, a bottom wall and a top wall, a pair of stub axles spaced, one axle behind the other, at opposite ends of the case and projecting outwardly from each side, tubular axle housings rigidly secured to said side walls and surrounding said stub axles, the drive means mounted on the outside of the transmission case on opposite walls thereof, means for mounting the transmission case to the main frame, the side walls of the transmission case being laterally spaced sufficiently from the side beams of the main frame of the loader to provide operator space on opposite sides of the transmission case between the side beams and the case, said drive means including chain and sprocket drives provided in the case wherein each of the stub axles carry a driven sprocket mounted thereon and a drive sprocket projects inwardly from the drive means mounted on the outside of the case and endless chains are interconnected between the drive sprocket associated with the drive means for the vehicle and the driven sprockets on the stub axles, the improvement comprising a gear reduction mechanism mounted on the outside of the transmission case and driving the drive sprocket of the vehicle and a hydrostatic motor coupled with the gear reduction mechanism to drive the drive means of the vehicle for propelling the skid steer vehicle in forward and reverse directions and an output shaft of the hydrostatic motor associated with the gear reduction mechanism of the drive system and the output shaft of the hydrostatic motor coupled to disc brake means for controlling rotation of the drive system of the vehicle.

2. An improved drive system for a skid steer vehicle as claimed in claim 1 wherein the drive means comprises independent drive systems mounted on opposite sides of the transmission case, each of the independent drive systems comprising a gear reduction mechanism and a hydrostatic motor coupled with the gear reduction mechanism to drive the chain and sprocket drives of the vehicle.

3. An improved drive system as claimed in claim 1 wherein the disc brake means comprises a mounting member rigidly coupled to the output shaft of the hydrostatic motor, the member having a brake disc connected thereto for rotation with the output shaft of the motor.

4. An improved drive system as claimed in claim 3 wherein an opening is provided in the transmission case through which the output shaft of the hydrostatic motor extends and the output shaft of the hydrostatic motor is mounted intermediate of the drive sprocket of the gear reduction mechanism and the driven sprocket of the chain and sprocket drive, the output shaft of the hydrostatic motor and the brake mechanism coupled thereto extending between the chains of the chain and sprocket drives so as to avoid interference with the chain and sprocket drives of the vehicle.

5. An improved drive system for a skid steer vehicle having a loader main frame comprising laterally spaced longitudinally extending side beams and cross members at each end defining a generally rectangular interior space for receiving and partially surrounding a transmission case, said interior space also receiving an engine and hydraulic drive means for the vehicle, the drive system including a relatively narrow elongate transmission case having side walls, a bottom wall and a top wall, a pair of stub axles spaced, one axle behind the other, at opposite ends of the case and projecting outwardly from each side, tubular axle housings rigidly secured to said side walls and surrounding said stub axles, the drive means mounted on the outside of the transmission case on opposite walls thereof, means for mounting the transmission case to the main frame, the side walls of the transmission case being laterally spaced sufficiently from the side beams of the main frame of the loader to provide operator space on opposite sides of the transmission case between the side beams and the case, said drive means including chain and sprocket drives provided in the case wherein each of the stub axles carry a driven sprocket mounted thereon and a drive sprocket projects inwardly from the drive means mounted on the outside of the case and endless chains are interconnected between the drive sprocket associated with the drive means for the vehicle and the driven sprockets on the stub axles wherein the improvement comprising:

a gear reduction mechanism mounted on the outside of the transmission case and driving the drive sprocket of the vehicle;

a hydrostatic motor coupled with the gear reduction mechanism to drive the drive means of the vehicle for propelling the skid steer vehicle in forward and reverse directions;

an opening provided in the transmission case;

the gear reduction mechanism including a first output shaft having an inner end extending through the opening and a second output shaft associated with the hydrostatic motor of the drive system, the first output shaft carrying a reduction gear mounted thereon, the second output shaft carrying a pinion gear thereon, the pinion gear and the reduction gear operatively coupled to drive the drive system of the vehicle; and the inner end of the first output shaft carrying the drive sprocket, whereby the first output shaft is operatively connected with the chain and sprocket drive of the vehicle.

6. An improved drive system for the skid steer vehicle as claimed in claim 5, wherein the drive means comprises independent drive systems mounted on opposite sides of the transmission case, each of the independent drive systems comprising a gear reduction mechanism and a hydrostatic motor coupled with the gear reduction mechanism to drive the chain and sprocket drives of the vehicle.

7. An improved drive system for a skid steer vehicle as claimed in claim 5 wherein the second output shaft has coupled thereto disc brake means for controlling rotation of the drive system of the vehicle.

* * * * *